(12) United States Patent
Beltz

(10) Patent No.: US 6,801,231 B1
(45) Date of Patent: Oct. 5, 2004

(54) ENHANCED POINTING DEVICE FOR HANDICAPPED USERS

(76) Inventor: William M. Beltz, 814 Blanco La., Bryan, TX (US) 77801

( * ) Notice: Subject to any disclaimer, the term of this patent is extended or adjusted under 35 U.S.C. 154(b) by 298 days.

(21) Appl. No.: 09/572,674

(22) Filed: May 16, 2000

(51) Int. Cl.[7] .............................. G09G 5/00; G09G 5/08
(52) U.S. Cl. ........................ 345/865; 345/157; 345/158; 340/825.19
(58) Field of Search .................................. 345/157, 158, 345/865; 340/825.19

(56) References Cited

U.S. PATENT DOCUMENTS

| | | | |
|---|---|---|---|
| 4,578,674 A | | 3/1986 | Baker et al. |
| 4,746,913 A | * | 5/1988 | Volta .......................... 345/184 |
| 4,758,691 A | | 7/1988 | De Bruyne |
| 4,828,418 A | | 5/1989 | Sauer et al. |
| 5,126,731 A | | 6/1992 | Cromer, Jr. et al. |
| 5,422,640 A | | 6/1995 | Haley |
| 5,883,616 A | | 3/1999 | Koizumi et al. |
| 6,222,524 B1 | * | 4/2001 | Salem et al. ................. 345/157 |

* cited by examiner

*Primary Examiner*—John Cabeca
*Assistant Examiner*—Brian Detwiler
(74) *Attorney, Agent, or Firm*—David W. Carstens; Jeffrey G. Degenfelder; Carstens Yee & Cahoon LLP

(57) ABSTRACT

The present invention provides for an enhanced mouthstick device that allows. disabled individuals, having limited or no use of their hands, to independently, effectively and efficiently simulate computer mouse manipulation and input data in computer software applications. The present invention also allows disabled individuals, having limited or no use of their hands, to effectively utilize standard, commercially available, off-the-shelf GUI or windows-based software applications without requiring modification to the actual software application. The invention is comprised of three functional components mounted on a traditional mouthstick and a reception unit which is fitted to a computer display screen. The user manipulates the position of the cursor on the display screen by moving the StickMouse towards the desired position on the display screen. A signal transmitter unit transmits constant position signals which are received by the sensors on the reception unit. The reception unit calculates the location of the signal transmitter unit and converts the position coordinates into a serial bit stream which is transferred to the computer for display on the display screen.

When the user wishes to perform a mouse button command input, the user utilizes the sip-and-puff procedures to trigger a pressure transducer which converts the user-induced, pneumatic signal into an electrical signal which is relayed to a signal. transmitter unit. The signal transmitter unit transmits the mouse button command signal to sensors on the reception unit where it is converted into a serial bit stream and transferred to the computer for execution

15 Claims, 8 Drawing Sheets

| FUNCTION | MOUSE ACTUATION | STICKMOUSE ACTUATION |
| --- | --- | --- |
| Left Click | Press Left Mouse Button. | Puff StickMouse. |
| Right Click | Press Right Mouse Button. | Sip StickMouse. |
| Left Double Click | Press Left Mouse Button Twice Quickly. | Puff StickMouse Twice Quickly. |
| Right Double Click | Press Right Mouse Button Twice Quickly. | Sip StickMouse Twice Quickly. |
| Hold Left Click | Press Left Mouse Button and hold down. | Puff StickMouse and hold the Puff air pressure. |
| Hold Right Click | Press Right Mouse Button and hold down. | Sip StickMouse and hold the Sip air pressure. |
| Mouse Cursor Movement | Move Mouse in the direction of desired screen object relative to current cursor position. | Move StickMouse in the direction of desired screen object relative to current cursor position. |
| Drag-and Drop Screen Object *assume cursor is positioned on the desired object* | Press Left Mouse Button and hold down while Mouse is moved in the direction of the desired screen position. | Puff into StickMouse and hold air pressure while StickMouse is moved in the direction of the desired screen position. Release air pressure on StickMouse when the object is at the desired screen position. |
| Mark Block Sections of Text *assume cursor is positioned on the desired object* | Press Left Mouse Button and hold down while Mouse is moved in the direction of the desired block end position. When the text is highlighted through to the desired block end position, release Mouse Button. | Puff into StickMouse and hold air pressure while StickMouse is moved in the direction of the desired block end position. When the text is highlighted through to the desired block end position, release the air pressure. |

FIGURE 7

ENHANCED POINTING DEVICE FOR HANDICAPPED USERS

GOVERNMENT SUPPORT

This invention was made with Government support under DMI-9961205 awarded by the National Science Foundation. The Government has certain rights in this invention.

TECHNICAL FIELD

This invention generally relates to computer "mouse" devices. More particularly, the invention relates to a device held in the mouth and useful by individuals having limited or no use of their hands to simulate mouse manipulation in Graphical User Interface (GUI) applications.

DESCRIPTION OF THE RELATED ART

The device of the present invention is designed to greatly improve the ability of disabled individuals who have limited or no use of their hands to use software applications utilizing Graphical User Interfaces (GUIs). Each day, the ability to use GUIs or windows-based software applications on a personal computer becomes more essential to both personal and professional achievement. This capability is essential to take advantage of employment and educational opportunities both in and out of the computer industry. The most widely used computer operating system as well as most popular office applications (i.e., word processing, spreadsheet and presentation packages) all utilize GUIs. Moreover, with the advent of the Internet and the emergence of e-commerce, the ability to effectively and efficiently utilize GUIs will become critical in all aspects of life.

At the user level, GUIs are utilized by employing three basic computer mouse operations: (1) "point-and-click"; (2) "drag-and-drop"; and (3) "double-click". However, while basic, these three operations actually require complex and coordinated hand and eye movements. The majority of computer operators take for granted the complex set of mouse movements, mouse clicks, and keyboard manipulations inherent in using GUI applications. Furthermore, the typical user is scarcely aware of the powerful user functionality created by the mouse and keyboard that allow him to efficiently utilize the software application. In fact, as a typical user's skill levels increase, the keystrokes and mouse clicks become more automatic and intuitive, causing the interface's look and feel to become deceptively easy to manipulate. However, for physically disabled individuals, the basic operations necessary to properly utilize GUIs and window-based applications are oftentimes arduous and cumbersome if not at times impossible.

Physically disabled individuals who lack the ability to utilize normal arm and/or hand movement must depend on assistive devices and/or software to help them control a computer in the same manner as a non-disabled user. Existing assistive devices do not provide disabled persons with a comparable ability to both manipulate screen objects using "point-and-click", "drag-and-drop", and "double-click" and to control the keyboard effectively and efficiently.

U.S. Pat. No. 4,828,418 to Sauer et al. discloses a representative prior art effort to develop a device to enable quadriplegic individuals with only limited or no use of the hands to perform certain task such a operating the keyboard of a personal computer. The Sauer device consists of a malleable mouthpiece attached to a shaft capable of having various implements fixed to it allowing the handicapped user to perform certain tasks independently. While the Sauer device can efficiently manipulate the keyboard, it cannot effectively control the mouse.

U.S. Pat. No. 5,422,640 to Haley discloses a breath actuated pointer device whereby a handicapped person can operate a personal computer. The Haley device consists of a base which includes an inclined support onto which a computer keyboard is positioned. An attachment arm supports a pivoting pointer which can be manipulated by the user to position the pointer over the appropriate key on the keyboard. The tip of the pointer is then actuated outwardly by the user imparting a breath into the breath port of the pointer. A pressure sensor transducer detects the user's breath and actuates a solenoid extending the tip of the pointer to depress the desired computer keyboard key. As with the Sauer device, the Haley device can also efficiently manipulate the keyboard, but cannot effectively control the mouse.

There are devices in the prior art which a capable of simulating mouse manipulation. Such devices can generally be categorized into one of the following groups: (a) numeric keypad mouse; (b) voice recognition systems; and (c) point and click headgear.

A numeric keypad mouse utilizes a separate numeric keypad on the main keyboard to simulate the movements of the computer mouse. For example, the numbers surrounding the numeral '5'(i.e., '2', '6', '8', and '4') on the keypad will move the cursor relative to its current position (i.e., down, right, up and left, respectively). More recent models of keyboards have individual arrow keys dedicated exclusively to cursor movements. Other keys are used to simulate double-click, right click, and left click of a computer mouse. For the disabled users who lack the ability to utilize normal arm and/or hand movement, the numeric keypad is typically used by striking the appropriate arrow and command keys with a mouthstick positioned in the user's mouth. However, using the mouthstick in such a manner prevents the user from being able to easily view the computer display screen while working because his eyes are focused on which key to strike (i.e., the user's head must be turned away from the display screen in order to press the arrow and command keys on the keyboard with the mouthstick.). To simultaneously press the keypad and focus on the display screen requires the user to position his eyes at the top of his eye sockets resulting in extreme eye fatigue. The user tends to use his peripheral vision to see where the cursor on the screen is moving. As a result, the user is easily fatigued.

Devices utilizing voice recognition systems are rapidly gaining acceptance in the computer industry. However, while voice recognition systems are evolving into a more dependable technology, there are several limitations inherent to applications involving physically disabled individuals. First, effective voice recognition depends on the clarity and consistency of the voice. A percentage of physically disabled individuals cannot speak clearly enough for the systems to work effectively. This is especially true for individuals with cerebral palsy or advanced multiple sclerosis. Additionally, many paralyzed individuals have breathing problems or simply lack the strength to effect consistent enunciation. Second, there are currently no voice recognition systems which are capable of both manipulation of the cursor in a GUI environment and text generation. Current voice recognition systems tend to work best in custom tailored direct data entry applications and not general computer applications.

There are a variety of point and click headgear mechanisms in the prior art. Point and click headgear devices generally utilize ultrasound or light detectors to position the cursor on the computer screen and a "sip-and-puff" device to simulate pressing the mouse buttons. "Sip-and-puff" refers to breath-operated devices wherein the user initiates commands to the control unit by either blowing or sucking air from the mouthpiece.

U.S. Pat. No. 5,126,731 to Cromer, Jr. et al. discloses a pneumatically-controlled, user-operated switch interface capable of enabling a disabled person to effectively operate a variety of control devices such as computer input devices, video game controllers and television remote controls. The Cromer device mimics the signals generated to a control device by wiring a pneumatically-controlled, user-operated switch interface in parallel with a computer control puck. Typically, an input device consists of two components: (a) a computer puck having manual switch buttons which communicate with (b) the digitizing tablet for collectively controlling the operation of the particular device. By wiring the pneumatically-controlled, user-operated switch interface in parallel with a computer control puck, the puck's signal output may be replicated by the device. While the Cromer device is suitable for manipulating a computer mouse, it provides no means for inputting data via the computer keyboard.

U.S. Pat. No. 5,883,616 to Koizumi et al. discloses a headgear device whereby handicapped users can enter characters by shifting their heads and actuating a breath-operated, optical signal transmitter while looking at an image display device on which the entered characters are shown. A major disadvantage to the Koizumi device is that it is attached to the user's head. Thus, people with no hand and arm functionality cannot put on or remove the gear from their head without help. Another disadvantage is that the keyboard is displayed on the display device obscuring the current GUI or window-based application. As a result, the Koizumi headgear device is not well-suited for general applications.

SUMMARY OF THE INVENTION

It is therefore an object of the present invention to empower disabled individuals, having limited or no use of their hands, with an ability to independently, effectively and efficiently simulate computer mouse manipulation and input data in computer software applications.

It is another object of this invention to empower disabled individuals, having limited or no use of their hands, with an ability to effectively utilize GUI or windows-based computer applications in the home or office environment.

It is still another object of this invention to empower disabled individuals, having limited or no use of their hands, with an ability to effectively utilize standard, commercially available, off-the-shelf GUI or windows-based software applications in the home or office environment without requiring modification to the actual software application.

The present invention provides for an enhanced mouthstick capable of not only inputting data via a standard keyboard but also capable of effective cursor positioning and mouse command inputs. The present invention consists of three functional components mounted on a traditional mouthstick and a reception unit mounted on a computer display screen. The three functional elements of the mouthstick are: 1) an enhanced mouthpiece, 2) a cursor positioning system, and 3) a mouse button command controller.

The enhanced mouthpiece is based on the standard mouthpiece, with two important changes. First, the enhanced mouthpiece is constructed of a material that can be customized to a user's specific bite, shape, and size of mouth. Second, the enhanced mouthpiece incorporates a strategically placed hole allowing the user to control the mouse button controller utilizing a breath-operated mechanism. Through sips and puffs, the user provides the command inputs interpreted as left and right mouse button clicks by the command controller.

The cursor positioning system comprises a lightweight signal transmitter integrated into the mouthstick and a receiver unit attached to the computer. The signal transmitter utilizes wireless means to transmits its position data to the receiver unit. The receiver unit calculates the corresponding cursor position based upon a triangulation of the signal transmitter's physical position.

The mouse button command controller comprises an pneumatically-controlled, user operated switch interface which allows the user to control mouse button commands (e.g., left click, right click, click-and-hold, double click) to the computer through sips and puffs via the enhanced mouthpiece. The interface consists of a pneumatically controlled, user operated switch which provides electrical input signals to a button press signal transmitter. The signal transmitter utilizes wireless means to transmit mouse command inputs to a receiver unit which is interfaced with the computer.

Software means are utilized to effectively interface cursor position and mouse command signals transmitted to the reception unit with the standard mouse controllers integral to the computer's operating system.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 7 is a tabulation of one embodiment of the user controlled, breath-actuated inputs for controlling mouse functionality.

DETAILED DESCRIPTION

Figure 1A:
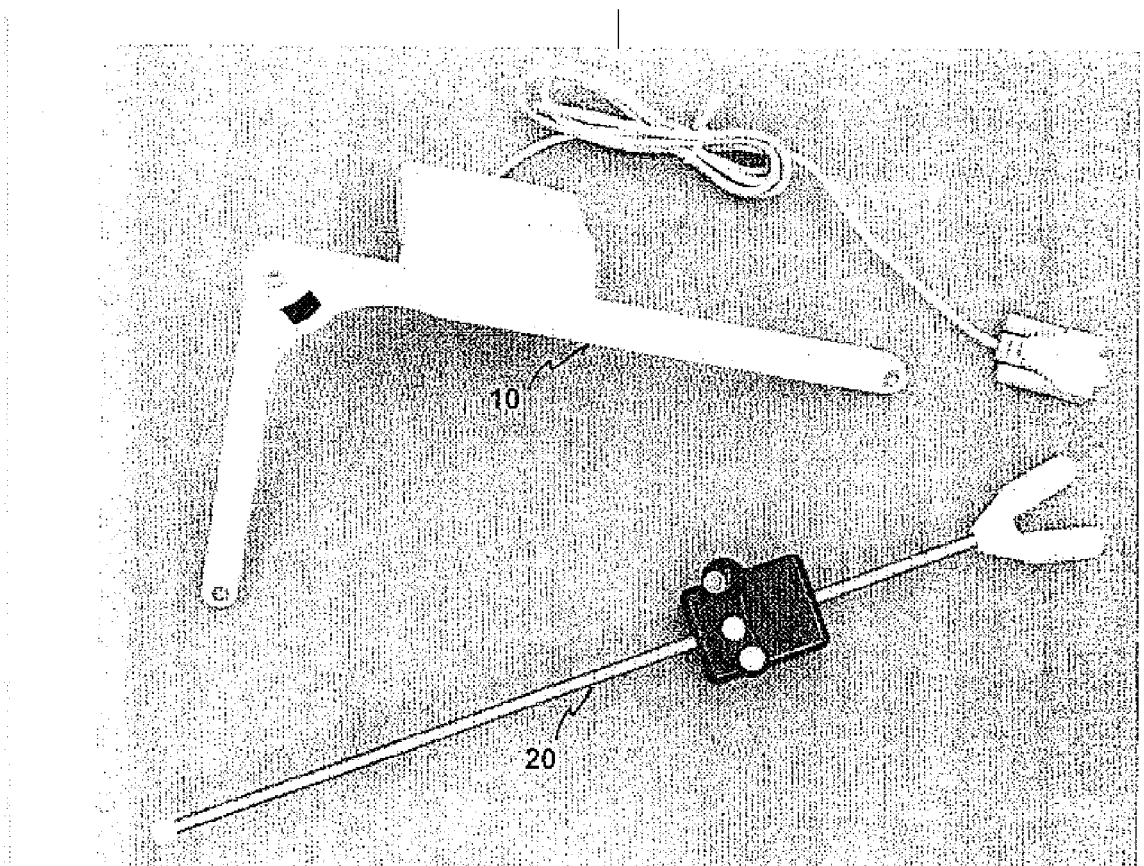
FIG. 1A illustrates a perspective view of the device of the present invention.
Figure 1B:
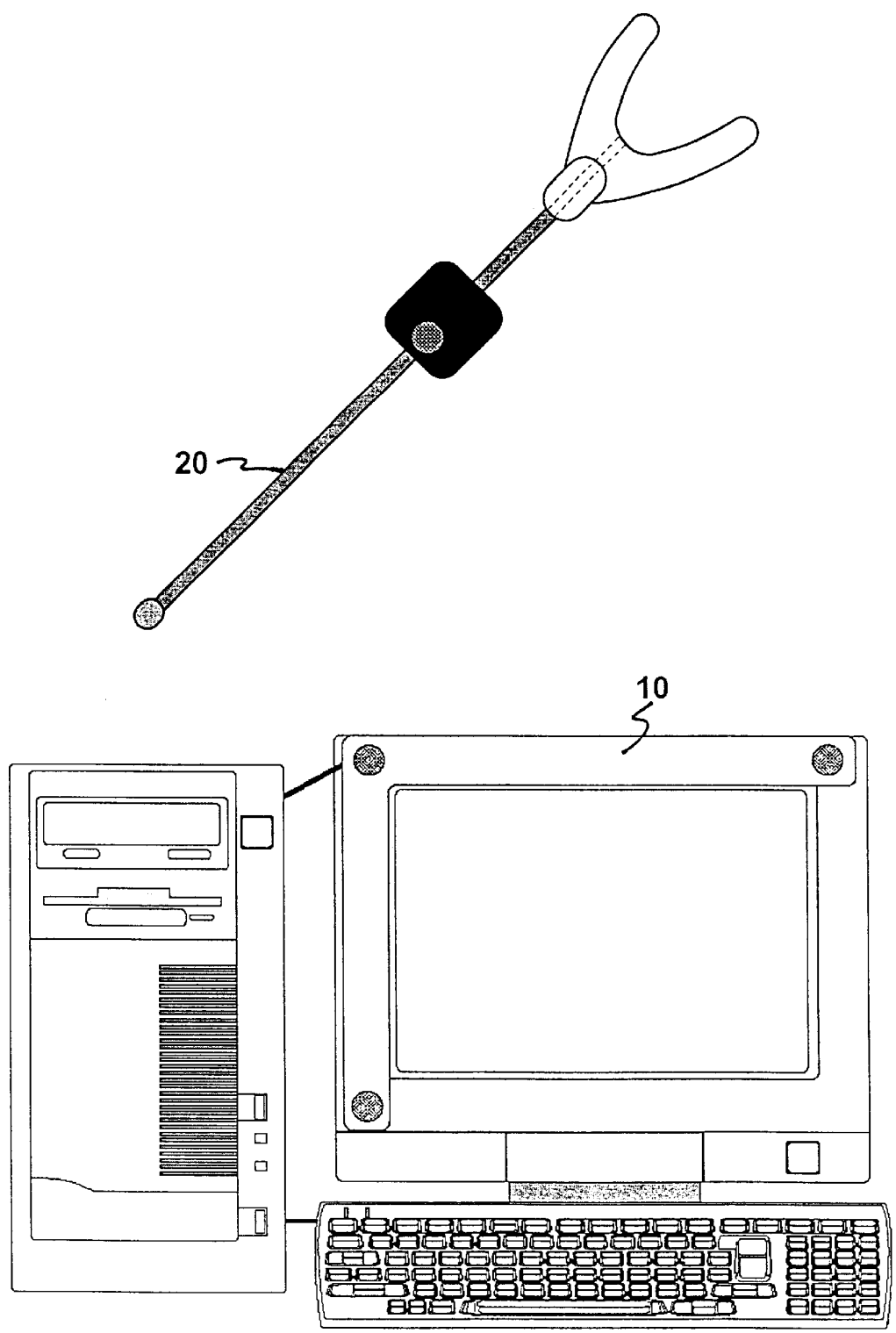
FIG. 1B illustrates a perspective view of the device of the present invention incorporated onto a representative computer system.

FIG. 1A shows an enhanced pointing device for handicapped users constructed in accordance with the present invention. The device consists of two components parts: an enhanced mouthstick pointing device unit 20 and a reception unit 10. In one embodiment of the present invention, as shown in FIG. 1B, the reception unit 10 is designed to fit on the front face of common computer display monitors. The reception unit is connected to the computer via the standard mouse serial port.

Figure 2:
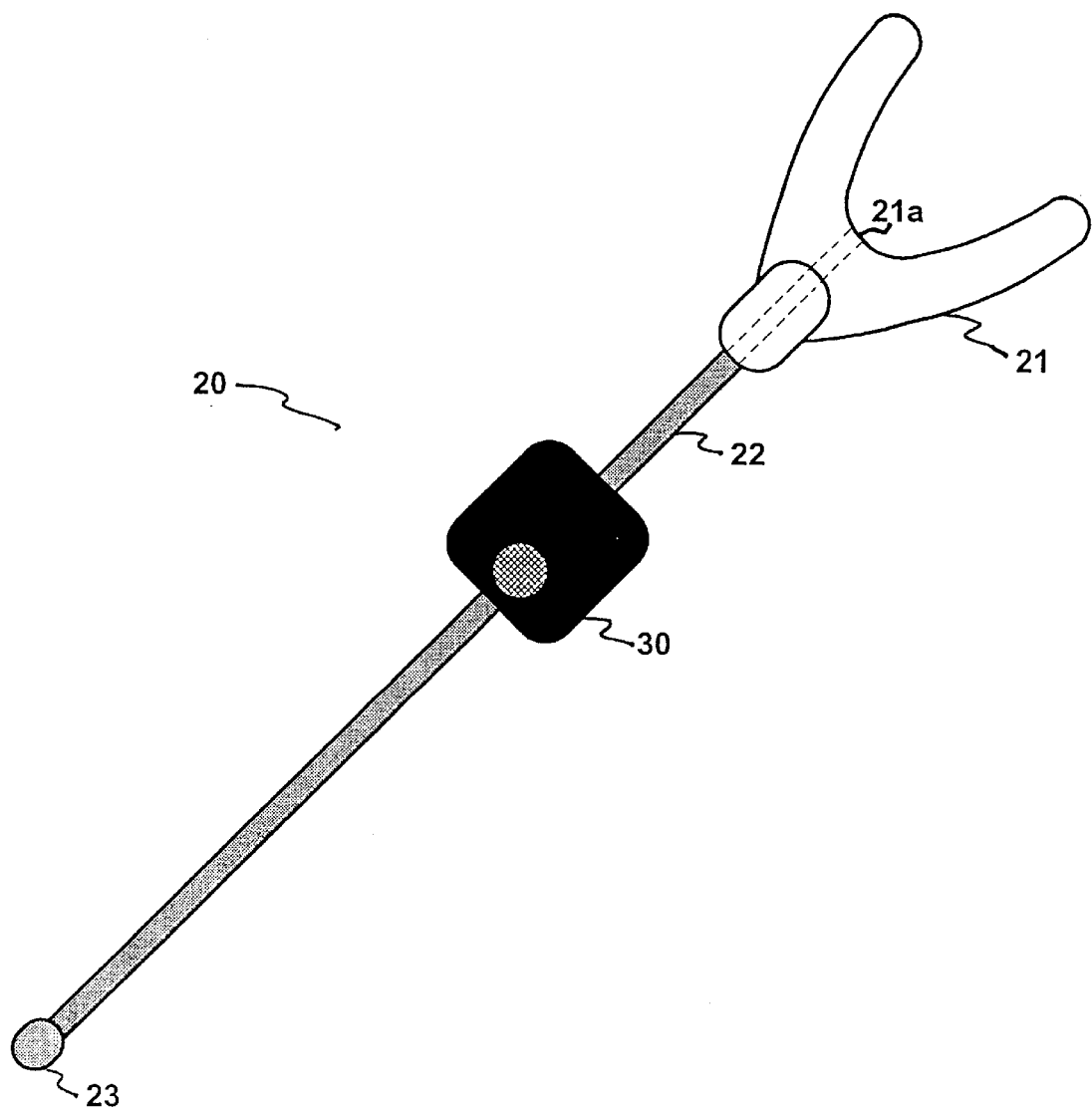
FIG. 2 illustrates a perspective view of the enhanced mouthstick pointing device of the present invention.
Figure 3:
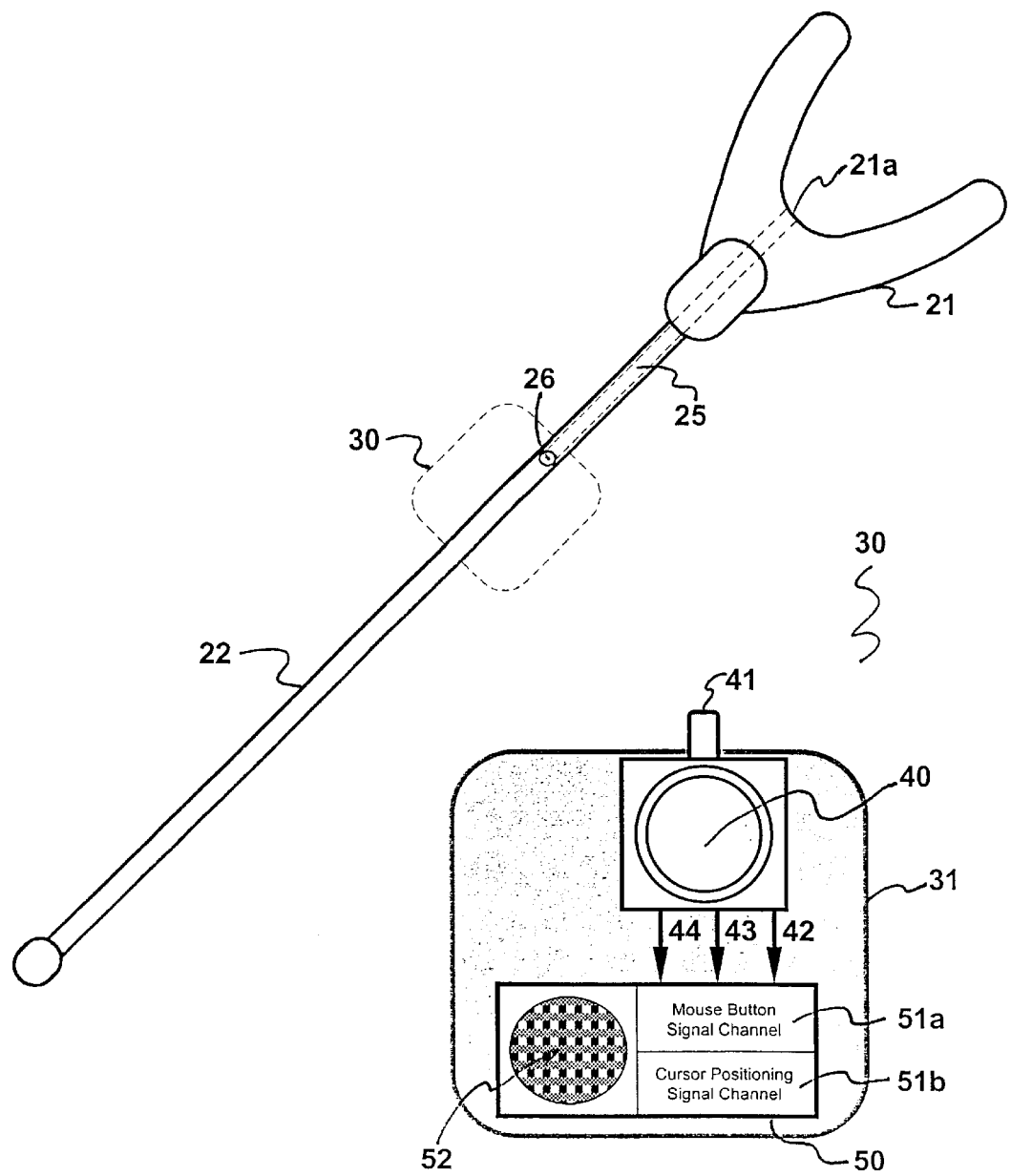
FIG. 3 illustrates a cut-away perspective view of the enhanced mouthstick pointing device of the present invention and a block diagram of the signaling transmitter component of the device of the present invention.

FIGS. 2 and 3 show perspective views of the enhanced mouthstick pointing device or StickMouse 20 of the present invention. The StickMouse 20 comprises an enhanced mouthpiece unit 21 connected to a hollow cylindrical shaft 22 which terminates with tip 23, typically a soft rubbery material useful for lightly gripping computer keys without slippage. Additionally, a signaling transmitter module 30 is attached to the cylindrical shaft 22.

The enhanced mouthpiece unit 21 comprises a conventional mouthpiece design with two modifications. First, the enhanced mouthpiece unit 21 is designed to receive the cylindrical shaft 22. Second, an airway passage 21a between the inside edge of the mouthpiece and a hollow 25 in the cylindrical shaft 22 allows the user to fluidly communicate with a pressure transducer 40 located in the signaling transmitter module 30. The enhanced mouthpiece unit 21 is adaptable to being customized to comfortably fit each particular user's mouth. Mouthpiece shape is a critical factor for creating an effective mouthstick device. The mouthpiece must take into account the physical requirements of the user as well as specific customization features. While comfort is paramount to the design of a suitable mouthpiece, a mouthpiece must not be overly malleable or soft. It is important that the material chosen for the enhanced mouthpiece unit 21 have adequate rigidity to prevent deformation at body temperature since control of the shaft 22 and tip 23 are adversely affected by soft and resilient materials.

In addition to being non-toxic and lightweight, a suitable material must also be suitably rigid, strong and durable. A rigid mouthpiece is essential for effective mouthstick typing. When typing with a rigid mouthpiece, the downward force applied to the mouthpiece is directly transferred through the stick to the key of the keyboard. If the mouthpiece bends during the typing evolution, the downward force applied by the mouthstick is diminished such that additional force is required to actuate a keyboard key.

A suitable mouthpiece material must also exhibit a certain level of strength capable of withstanding the exertion of force in many different directions. Currently, mouthsticks are used for many purposes including flipping light switches, pushing buttons, turning pages in a book, and sliding objects across a table. In many situations, including as a computer interface, the user must be able to apply considerable force to the mouthpiece for it to function properly. For example, sliding a keyboard several inches to a usable position on a table can require the exertion of significant sideways force on the mouthpiece.

A suitable mouthpiece material must also exhibit a certain level of durability. The durability of a mouthpiece directly effects the length of time a mouthpiece will be functional. A suitable mouthpiece material must be durable enough to withstand the abuse of constant use for many years.

It is understood by those skilled in the art, that a variety of materials exist for constructing suitable mouthpiece assemblies. The mouthpiece of one embodiment is constructed of a bio-compatible vinyl material capable of being molded to comfortably fit in the user's mouth. It is further understood that the user can breath normally through their nose or around the outer periphery of the enhanced mouthpiece unit 21 while using the StickMouse 20. Signaling through the enhanced mouthpiece unit 21 is achieved by forcibly directing high or low pressure air to the airway passage 21a of the enhanced mouthpiece unit 21 and on through to the pressure transducer 40 located in the signaling transmitter module 30

"High pressure air" means a higher than normal atmospheric air pressure produced by an individual puffing or blowing into an airway passage. "Low pressure air" means a lower than normal atmospheric air pressure produced by an individual sipping or sucking into an airway passage.

The enhanced mouthpiece unit 21 is attached to a cylindrical shaft 22 constructed of a suitably lightweight, yet rigid and strong material. It should be understood that other shapes for shaft 22 can be used, e.g., oblong, hexagonal, square, etc. It should be further understood that shaft 22 need only contain a hollow 25 in the section between the enhanced mouthpiece 21 and the signaling transmitter module 30. While one embodiment is constructed of a single hollow cylindrical aluminum shaft, it should be further understood that the shaft 22 may also be constructed utilizing multiple adjoining shafts of varying materials. In general, the hollow cylindrical shaft 22 must be constructed of materials sufficiently strong to withstand high pressure air and sufficiently rigid not to collapse when subjected to low pressure air. Shaft 22 must also be sufficiently strong and rigid to withstand torque induced by impact against the keyboard without deflection or deformation.

FIG. 3 illustrates a cut-away perspective view of the enhanced mouthstick pointing device of the present invention and a block diagram of the signaling transmitter component of the device of the present invention. The hollow 25 of shaft 22 between the enhanced mouthpiece 21 and the signaling transmitter module 30 serves as an airway conduit between the airway passage 21a of the enhanced mouthpiece 21 and the signaling transmitter module 30. The signaling transmitter module 30 is composed of a protective housing unit 31 containing a pressure transducer 40 connected to a signal transmitter unit 50. The signal transmitter unit 50 further consists of an emitter unit 52 functionally connected to two signal channels 51a and 51b.

The pressure transducer 40 accesses the airway conduit via an appendant intake port 41 inserted into a hole 26 in shaft 22 which exposes the hollow 25 of shaft 22. Thus, the intake port 41 is coupled with the airway conduit providing fluid communication between the airway passage 21a of the enhanced mouthpiece 21 and the pressure transducer 40 located in the signaling transmitter module 30.

While one embodiment of the present invention shows the enhanced mouthpiece 21, pressure transducer 40 and signaling transmitter module 30 as three separate components, those skilled in the art will recognize and understand that all three may be conglomerated into a single component.

Figure 4:
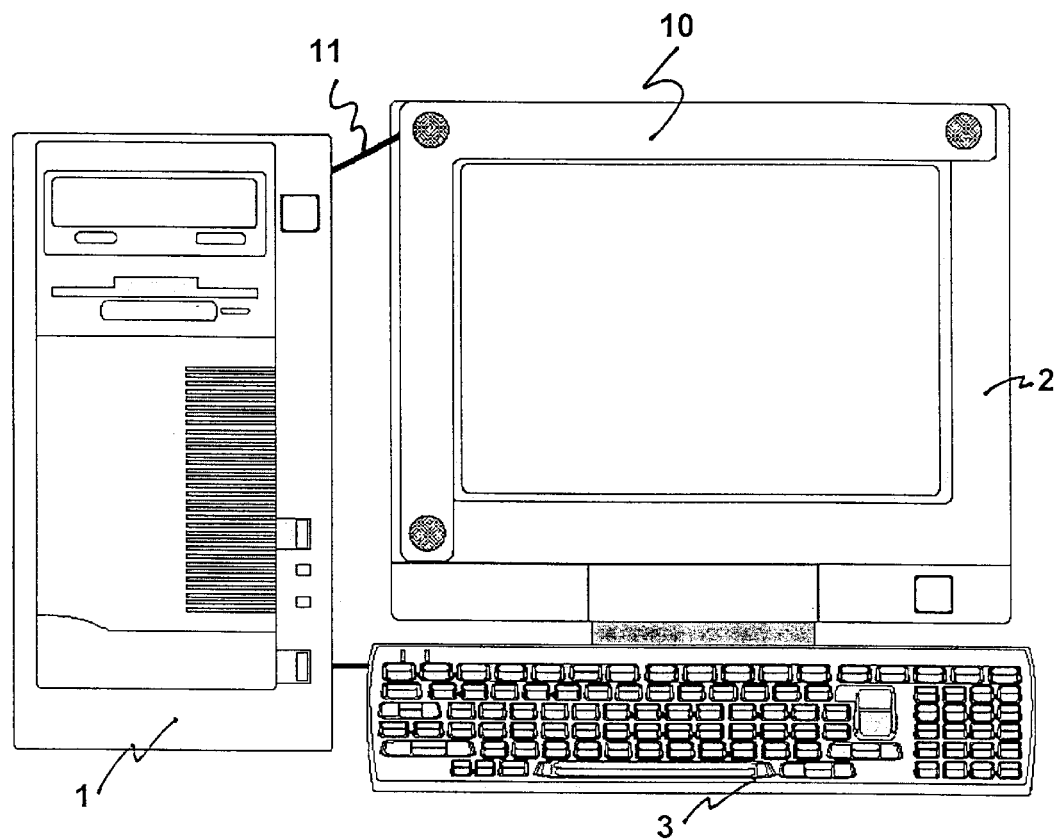
FIG. 4 illustrates a perspective view of the receiving component of the device of the present invention incorporated onto a representative computer system.
Figure 5:
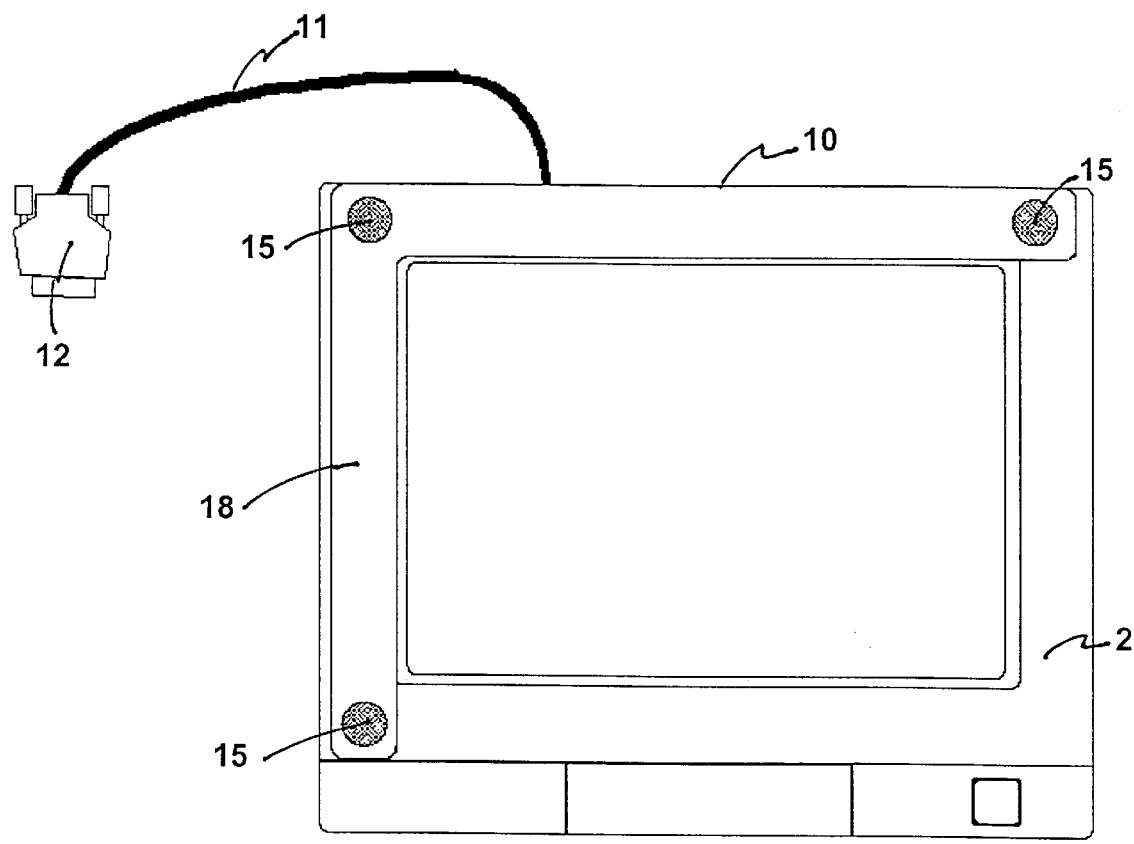
FIG. 5 illustrates a perspective view of the receiving component of the device of the present invention as it is incorporated onto the display screen of a representative computer system

The pressure transducer 40 is a pneumatically controlled, user-operated switch interface capable of converting high and low air pressure signals from the user into electrical signals. In one embodiment, a single pole, double throw vacuum/pressure electrical switch is utilized as pressure transducer 40. The pressure transducer 40 is wired in parallel with the switching interface of the manual control buttons of the signal transmitter unit 50. The signal transmitter unit 50 emits signals via its emitter 52. The signals are transmitted via wireless means to sensors located on the reception component of the present invention Two classes of signals are transmitted by the signal transmitter unit 50: 1) position signal information, and 2) mouse button signal information. Signals transmitted by the signal transmitter unit 50 are received by appropriate sensors in the reception component of the present invention. As shown in FIGS. 4 and 5, a plurality of sensors 15 are incorporated into the front face 18 of reception unit 10. The reception unit 10 of one embodiment is designed to fit over the outer bezel of common computer display monitors 2. However, it should be understood that sensors 15 may also be incorporated into the bezel of a computer display monitor. The sensors 15 must be arranged such that an x-axis and y-axis component can be generated via triangulation. The reception unit 10 is connected via a cable 11 and standard connector plug 12 to the computer's 1 standard mouse serial port. The computer 1 utilizes software means to process the various signals received into corresponding movements on the display and mouse button command inputs.

In one embodiment of the present invention, the signal transmitter unit 50 and reception unit 10 may be realized by adapting components from the FreeD wireless 3D joystick manufactured and sold by Pegasus Technologies, Ltd. The base unit of the product is utilized as the reception unit 10 and the 3D input device is adapted for use as a signal transmitter unit 50. As shown in FIG. 3, three electrical connections 42, 43, and 44 from pressure transducer 40 are wired in parallel with the push button interfaces of the 3D input device (i.e., the signal transmitter unit 50). The reception unit 10 incorporates two ASICs which include signal processing hardware and signal processing software algorithms which supports real-time calculations. Position signal information can be transmitted utilizing ultrasonic signals from the signal transmitter unit 50 to the reception unit 10. Using digital to analog (DTOA) methodology, the reception unit 10 calculates the location of the signal transmitter unit 50 by use of triangulation measurements. Mouse button command input signals are transmitted from the signal transmitter unit 50 to the reception unit 10 using infra-red signals. While one embodiment of the present invention utilizes ultrasonic signals to transmit position information and infra-red signals to transmit mouse button command input signals, it is understood and can be appreciated by one with ordinary skill in the art, that there are many other wireless systems known and commercially available which could be modified as taught herein without departing from the scope of the invention. Thus, the present invention envisions utilization of the entire signaling spectrum to accomplish its signaling requirements. It is also understood that the position and mouse command signals could also be transmitted utilizing only one type of signaling using common multiplexing techniques well known to those skilled in the art.

Figure 6:
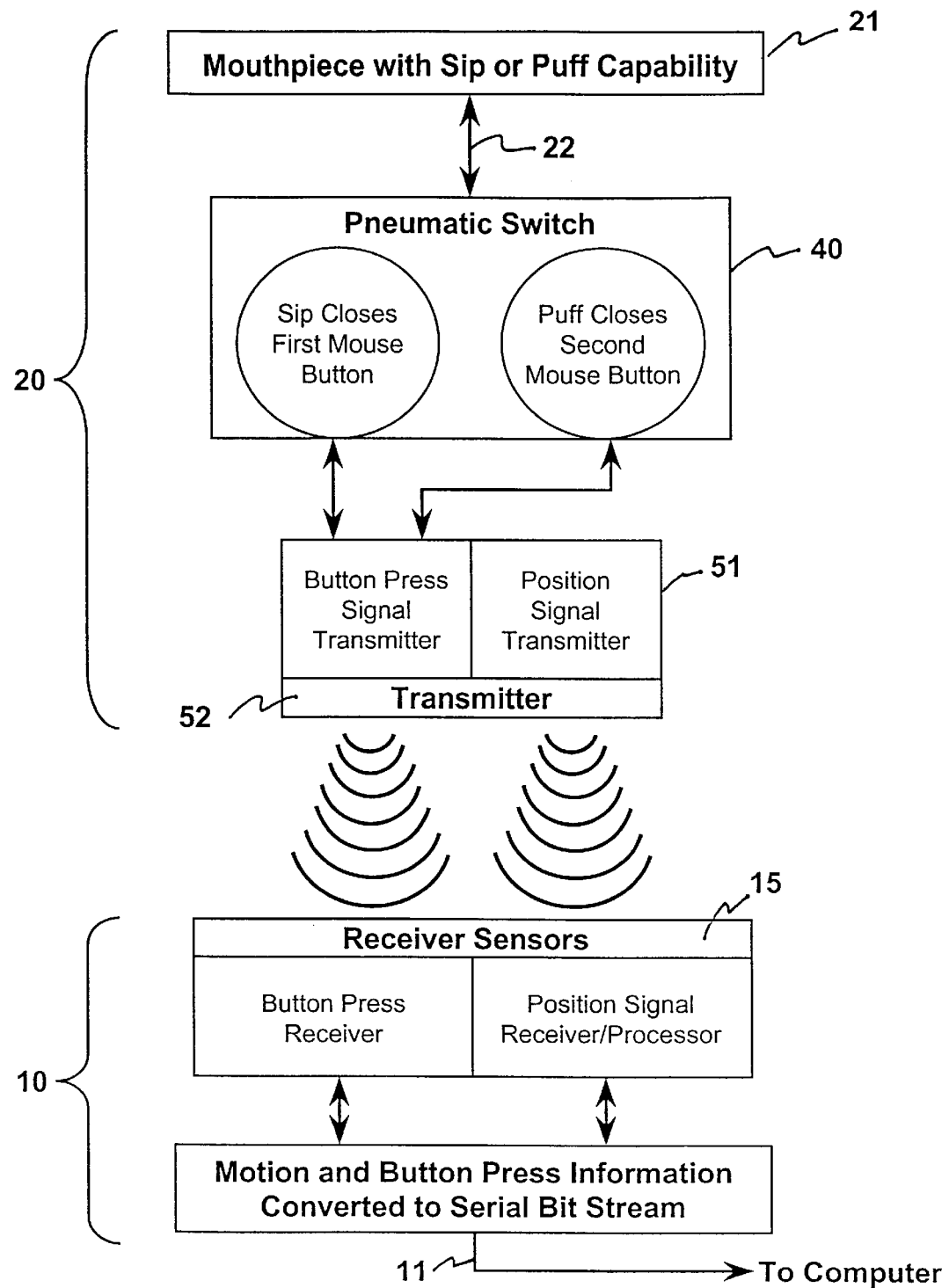
FIG. 6 is a simplified block diagram of the enhanced pointing device according to the present invention.

Referring to FIGS. 6 and 7, the operation of the above-described enhanced pointing device for handicapped users may be briefly described as follows: The physically disabled user turns on the computer or GUI device and inserts the enhanced mouthpiece 21 of the StickMouse 20 into his mouth. The user normally breathes through his nose or around the perimeter of the enhanced mouthpiece 21. The user manipulates the position of the cursor on the display screen by moving the StickMouse 20 towards the desired position on the display screen. The signal transmitter unit 50 transmits constant position signals which are received by the sensors 15 on the reception unit 10. The reception unit 10 calculates the location of the signal transmitter unit 50 and converts the position coordinates into a serial bit stream. The reception unit 10 transfers the serial bit stream to the computer for display on the display screen.

When the user wishes to perform a mouse button command input, the user utilizes the sip-and-puff procedures as outlined in FIG. 7. For example, if the user wishes to perform a "left click" command (i.e., to position the cursor in a standard word processing program for text insertion), the user puffs or blows into the airway passage 21a of the enhanced mouthpiece 21 an amount of air sufficient to raise the air pressure in the airway conduit enough to trigger the pressure transducer 40. The pressure transducer 40 converts the user-induced, pneumatic signal into an electrical signal which is relayed to the signal transmitter unit 50. The signal transmitter unit 50 transmits the mouse button command signal to sensors 15 on the reception unit 10. The reception unit 10 converts the mouse button command signal into a serial bit stream and transfers the signal to the computer 1 for execution.

Thus, it will be understood that various details of the invention may be changed without departing from the scope of the invention. Furthermore, the foregoing description is for the purpose of illustration only, and not for the purpose of limitation—the invention being defined by the claims.

What is claimed is:

1. A device for permitting a person with limited or no use of the hands to operate and manually input data into a computer that utilizes a graphical user interface application, said device comprising:
   a mouth-held unit comprising
      (a) a mouthpiece having an airway passage formed therethrough,
      (b) a shaft having one end secured within said mouthpiece and a distal end configured for performing keyboard entry, wherein said shaft includes a hollow portion aligned with and fluidly connected to said airway passage, and
      (c) a control module attached to said shaft, wherein in said module includes,
         i) a switching means fluidly connected to said hollow portion, wherein said switching means generates a first signal in response to an air pressure signal initiated by the person at said air passage,
         ii) at least one emitting means for transmitting the first signal and a second signal; and
   a reception unit with a first detector means for detecting said first signal and a second detector means for detecting said second signal.

2. The device of claim 1, wherein said reception unit comprises means to calculate a relative position of said control module based upon said second signal.

3. The device of claim 2, wherein said reception unit comprises means to generate a coordinate data from said relative position of said control module based upon calculations made by said calculating means.

4. The device of claim 3, wherein said reception apparatus comprises means to relay said coordinate data and said first signal to said computer.

5. The device of claim 1, wherein said switching means is a pneumatically actuated electrical switch.

6. The device of claim 5, wherein said switching means comprises a single pole, double throw vacuum/pressure electrical switch.

7. The device of claim 1, wherein said emitting means comprises a first transmitter that utilizes ultrasonic means for signal transmission and a second transmitter that utilizes infra-red means for signal transmission.

8. The device of claim 1, wherein said first and second detector means each comprise a plurality of sensors arranged around the perimeter of a display device of computer.

9. An apparatus for assisting a person with limited or no use of the hands to operate and manually input data into a computerized device that utilizes a graphical user interface application, said apparatus comprising:

a mouth-held device comprising:
- (a) a mouthpiece having an airway passage formed therethrough,
- (b) a shaft having one end secured within said mouthpiece and a distal end configured for performing keyboard entry, wherein said shaft includes a hollow portion aligned with and fluidly connected to said airway passage, and
- (c) a control module attached to said shaft, wherein in said module includes:
  - i) a switching means fluidly connected to said hollow portion, wherein said switching means generates a first signal in response to an air pressure signal initiated by the person at said air passage,
  - ii) a signal transmitter unit comprised of at least one emitter for transmitting said first signal and a second signal; and a reception unit comprising:
- (a) a first sensor for receiving said first signal,
- (b) a second sensor for receiving said second signal, and
- (c) means for relaying said first and second signals to said computerized device.

10. The apparatus of claim 9, wherein said computerized device comprises means for positioning a cursor on a display device based upon said second signal.

11. The apparatus of claim 10, wherein said computerized device comprises means for controlling a functionality of said application based upon said first signal.

12. The apparatus of claim 9, wherein said switching means comprises a pneumatically actuated electrical switch.

13. The apparatus of claim 12, wherein said switch is a single pole, double throw vacuum/pressure electrical switch.

14. The apparatus of claim 9, wherein said signal transmitter unit comprises a first transmitter that emits an ultrasonic signal and a second transmitter that emits an infra-red signal.

15. The apparatus of claim 9, wherein said first and second sensors are each comprised of a plurality of electronic sensors arranged around the perimeter of a display device connected to said computerized device.

* * * * *

UNITED STATES PATENT AND TRADEMARK OFFICE
CERTIFICATE OF CORRECTION

PATENT NO. : 6,801,231 B1
DATED : October 5, 2004
INVENTOR(S) : William D. Beltz It is certified that error appears in the above-identified patent and that said Letters Patent is hereby corrected as shown below:

<u>Title page,</u>
Item [75], Inventors, name should read as follows:
-- William D. Beltz --

Signed and Sealed this

Eighteenth Day of January, 2005

JON W. DUDAS
*Director of the United States Patent and Trademark Office*